May 4, 1948.  L. J. CONROY  2,440,739
LEAD SCREW COUPLING
Filed April 25, 1945
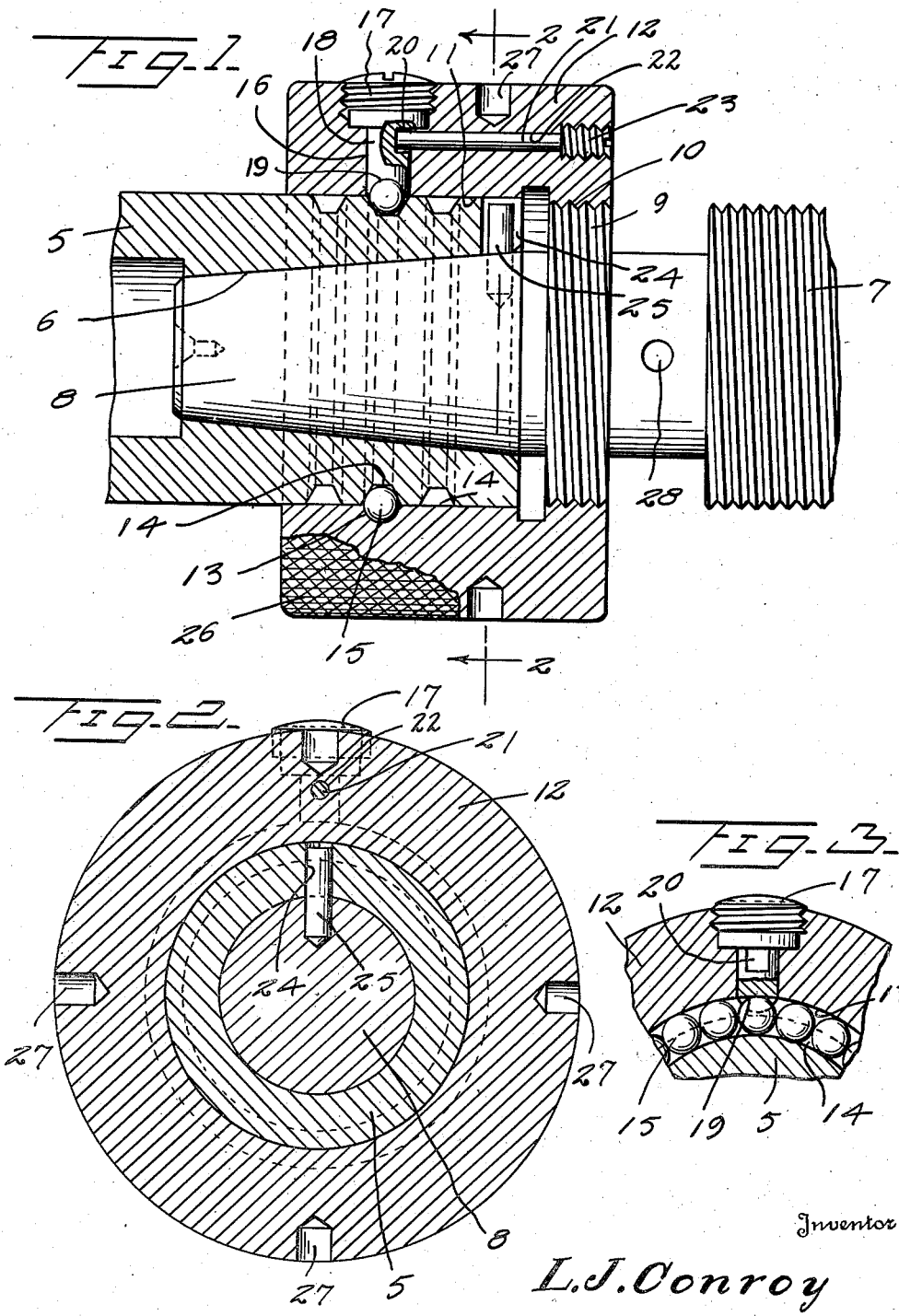
Inventor
L. J. Conroy
By Randolph & Beavers
Attorneys Patented May 4, 1948

2,440,739

UNITED STATES PATENT OFFICE 2,440,739

LEAD SCREW COUPLING

Leo J. Conroy, Waterloo, N. Y.

Application April 25, 1945, Serial No. 590,187

2 Claims. (Cl. 287—105)

1

The present invention relates to new and useful improvements in couplings of a type adapted for connecting lead screws to work head spindles of threading machines and for various other purposes where an easily manipulated coupling is desired for connecting male and female parts to each other.

An important object of the present invention is to provide a coupling of this character possessing certain definite advantages not possessed by other types of couplings and including the provision of a tapered seat in the spindle or female part in which a tapered stem on the male part, or lead screw, is seated and drawn in tight frictional engagement by the nut without excessive strain on the nut, such tapering construction and the nut providing a tight joint between the parts and further providing an interlocking connection between the male and female parts to eliminate play at the joint thereof.

A further object of the invention is to provide a device of this character of simple and practical construction, which is efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a longitudinal sectional view of the coupling.

Figure 2 is a transverse sectional view taken substantially on a line 2—2 of Figure 1, and Figure 3 is a detail of the locking plug for the ball bearings forming part of the coupling and with parts shown in section.

Referring now to the drawing in detail, wherein for the purpose of illustration I have disclosed a preferred embodiment of the invention, the numeral 5 designates a work head driving spindle which constitutes the female part of the coupling, the spindle being formed with a tapering bore 6.

The lead screw is designated at 7 and which forms the male part of the coupling, the inner end of the lead screw being formed with a tapering stem 8 conformably received in the tapering bore 6 of the spindle.

The lead screw 7 is formed with a threaded portion 9 at the inner end of the stem 8 adapted for threaded engagement with the internally threaded portion 10 in one end of the bore 11 of a

2 coupling nut 12, mounted for free rotation on the outer end of the spindle 5.

The outer surface of the spindle 5 is provided with spaced circumferential grooves 14 and the bore 11 of the nut 12 is formed with a groove 13 adapted for selectively registering with grooves 14 and for receiving a plurality of ball bearings 15.

The ball bearings are inserted in the grooves through a lateral passage 16 in the nut 12, the passage being closed after the insertion of the ball bearings by means of a plug 17 having a threaded head threaded in a countersink of the passage 16, the plug including a stem 18 having a recess or radius 19 formed at its inner end to conform to the groove 13 of the nut and to receive the balls therein, the inner end of the plug thus forming part of the raceway for the balls.

One side of the stem 18 is formed with a recess 20 adapted for receiving the inner end of a locking pin 21 inserted in a passage 22 extending parallel to the axis of the nut and having a threaded outer end 23 for securing the pin locking engagement in the nut.

The outer end of the spindle 5 is formed with a recess 24 in which a dowel pin 25 is adapted for engagement, the dowel pin projecting laterally from the inner end of the stem 8.

The plurality of circumferentially extending longitudinally spaced raceways 13 and 14 in the nut and spindle provide means for adjusting the nut 12 longitudinally on the spindle, the nut being freely rotatable on the spindle by means of the balls 15 seated in said grooves or raceways.

After the balls 15 have been placed in position in the grooves or raceways and secured therein by the plug 17 and locking pin 21, the stem 8 of the lead screw 7 is then inserted in the spindle with the dowel pin 25 seated in the recess 24 to prevent relative rotation thereof and the nut 12 is then threaded on the threaded portion 9 of the lead screw.

The tapered stem 8 is thus drawn tightly in the tapered bore 6 of the spindle and the parts thus coupled firmly to each other.

The outer periphery of the nut 12 is preferably knurled, as indicated at 26, and also formed with recesses 27 for receiving a spanner wrench and the lead screw 7 may also be formed with an opening 28 for receiving a pin or spanner wrench to hold the lead screw while the nut is being tightened.

In view of the foregoing description, taken in conjunction with the accompanying drawing, it is believed that a clear understanding of the construction, operation and advantages of the device will be quite apparent to those skilled in the art. A more detailed description thereof is accordingly deemed unnecessary.

While the foregoing specification sets forth the invention in specific terms, it is to be understood that numerous changes in the shape, size and materials may be resorted to without departing from the spirit and scope of the invention as claimed hereinafter.

Having thus described the invention what I claim is:

1. A coupling for male and female parts, said male part having a threaded section, a nut adapted for engagement with said threaded part, said female part having an external annular groove and said nut having an internal annular groove adapted for registering with the groove of the female part, ball bearings seated in said grooves for rotatably connecting the nut to the female part during threading engagement of the nut with the male part, said male part having a radial outwardly opening recess, a pin disposed therein and projecting therefrom, and said female part having a notch in an end thereof engaged by the pin for keying the parts together.

2. A coupling for male and female parts, said male part having a threaded section, a nut adapted for engagement with said threaded section, said female part having an external annular groove and said nut having an internal annular groove adapted for registering with the groove of the female part, said nut having a filler opening adapted for receiving balls for seating in said grooves for rotatably connecting the nut to the female part, a plug for said opening having a concave recess in its inner end conforming to the groove of the nut in one position of the plug, said plug having a radial recess, and locking means in said nut for detachably engaging the radial recess to retain the concave recess in alignment with the groove of the nut.

LEO J. CONROY.

REFERENCES CITED

The following references are of record in the file of this patent:

UNITED STATES PATENTS

| Number | Name | Date |
|---|---|---|
| 459,909 | Hogan | Sept. 22, 1891 |
| 1,424,820 | Heap | Aug. 8, 1922 |
| 1,774,050 | Brown | Aug. 26, 1930 |
| 1,962,739 | Hoegger | June 12, 1934 |

FOREIGN PATENTS

| Number | Country | Date |
|---|---|---|
| 152,019 | Switzerland | Apr. 1, 1932 |